(12) United States Patent
Chen

(10) Patent No.: US 8,385,040 B1
(45) Date of Patent: Feb. 26, 2013

(54) CONDUCTIVE WHEEL WITH STATIC DISSIPATION FUNCTION

(75) Inventor: Ching-Tsun Chen, Yuanlin Township, Changhua County (TW)

(73) Assignee: Der Sheng Co., Ltd., Changhua County (TW)

( * ) Notice: Subject to any disclaimer, the term of this patent is extended or adjusted under 35 U.S.C. 154(b) by 16 days.

(21) Appl. No.: 13/210,423

(22) Filed: Aug. 16, 2011

(51) Int. Cl.
*H05F 3/00* (2006.01)

(52) U.S. Cl. .................... 361/221; 361/216; 152/323

(58) Field of Classification Search .............. 361/221, 361/216; 152/323
See application file for complete search history.

(56) References Cited

U.S. PATENT DOCUMENTS

| | | | |
|---|---|---|---|
| 4,773,122 A * | 9/1988 | Wilcox | 16/18 R |
| 6,398,395 B1 * | 6/2002 | Hyun | 362/500 |
| 6,422,656 B2 * | 7/2002 | Denner et al. | 301/105.1 |
| 6,952,090 B2 * | 10/2005 | Chen | 320/101 |
| 7,011,317 B1 * | 3/2006 | Hicks et al. | 280/33.991 |
| 7,406,989 B1 * | 8/2008 | Casaus | 152/323 |
| 7,889,478 B2 * | 2/2011 | Yan | 361/221 |
| 8,024,595 B2 * | 9/2011 | Shinto | 713/330 |

* cited by examiner

*Primary Examiner* — Stephen W Jackson
*Assistant Examiner* — Angela Brooks
(74) *Attorney, Agent, or Firm* — Alan Kamrath; Kamrath IP Lawfirm, P.A.

(57) ABSTRACT

A conductive wheel for a cart includes a hub, a tread mounted on the hub, two bearings mounted in the hub and each having a axle, and an electrically conductive assembly mounted in the hub and the tread. Thus, the electrically conductive assembly will form a grounding effect to conduct and release the static charges produced between the two bearings and the cart to the ground so as to prevent from causing an electrical shock to a user when the user touching the cart, thereby protecting the user's safety when operating the cart.

14 Claims, 7 Drawing Sheets

CONDUCTIVE WHEEL WITH STATIC DISSIPATION FUNCTION

BACKGROUND OF THE INVENTION

1. Field of the Invention

The present invention relates to a wheel and, more particularly, to a conductive wheel for a cart, such as a shopping cart and the like.

2. Description of the Related Art

A conventional cart comprises a skeleton, a plurality of wheel brackets swivelably mounted on the bottom of the skeleton, a plurality of wheels rotatably mounted on the wheel brackets by a plurality of screw members, and a plurality of bearings mounted between the wheel brackets and the wheels. However, the bearings frequently contact with and rub the wheel brackets and the screw members to produce and accumulate static charges which are transferred through the wheel brackets to the skeleton so that when a user touches the skeleton, the static charges are conducted through the skeleton to the user's body, thereby easily causing an electrical shock to the user, and thereby causing danger to the user.

BRIEF SUMMARY OF THE INVENTION

In accordance with the present invention, there is provided a conductive wheel for a cart, comprising a hub, a tread mounted on the hub, two bearings mounted in the hub and each having a axle, and an electrically conductive assembly mounted in the hub and the tread.

The hub has a central portion provided with an inner flange and has a periphery provided with an outer flange. The hub has a mediate portion provided with a recessed support portion which is located between the inner flange and the outer flange. The inner flange of the hub has an interior provided with an axle hole and has two opposite sides each provided with a mounting recess connected to the axle hole. The tread coats and encompasses the outer flange of the hub. Each of the two bearings is mounted in the respective mounting recess of the inner flange of the hub. The axle of each of the two bearings is extended into the axle hole of the inner flange of the hub. The electrically conductive assembly includes a contact ring, a plurality of connecting rods each connected with the contact ring, a conductive ring located outside of the contact ring, and a connecting bar connected between the contact ring and the conductive ring. Each of the connecting rods of the electrically conductive assembly is extended axially along a periphery of the inner flange of the hub and is extended into and exposed from an inner wall of the mounting recess of the inner flange. Each of the connecting rods of the electrically conductive assembly is in contact with the two bearings. The contact ring of the electrically conductive assembly is extended into and exposed from an inner wall of the axle hole of the inner flange. The contact ring of the electrically conductive assembly is in contact with the axle of each of the two bearings. The conductive ring of the electrically conductive assembly is embedded in the outer flange of the hub. The conductive ring of the electrically conductive assembly has a periphery provided with a plurality of projecting grounding portions. Each of the grounding portions of the conductive ring is extended into and exposed from a surface of the tread. The connecting bar of the electrically conductive assembly is extended through the support portion of the hub and is extended into the outer flange of the hub.

The primary objective of the present invention is to provide a conductive wheel with a static dissipation function.

According to the primary advantage of the present invention, the electrically conductive assembly between the hub and the tread will form a grounding effect to conduct and release the static charges produced by rubbing or other actions between the two bearings and the cart to the ground so as to prevent from causing an electrical shock to a user when the user touching the cart, thereby protecting the user's safety when operating the cart.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
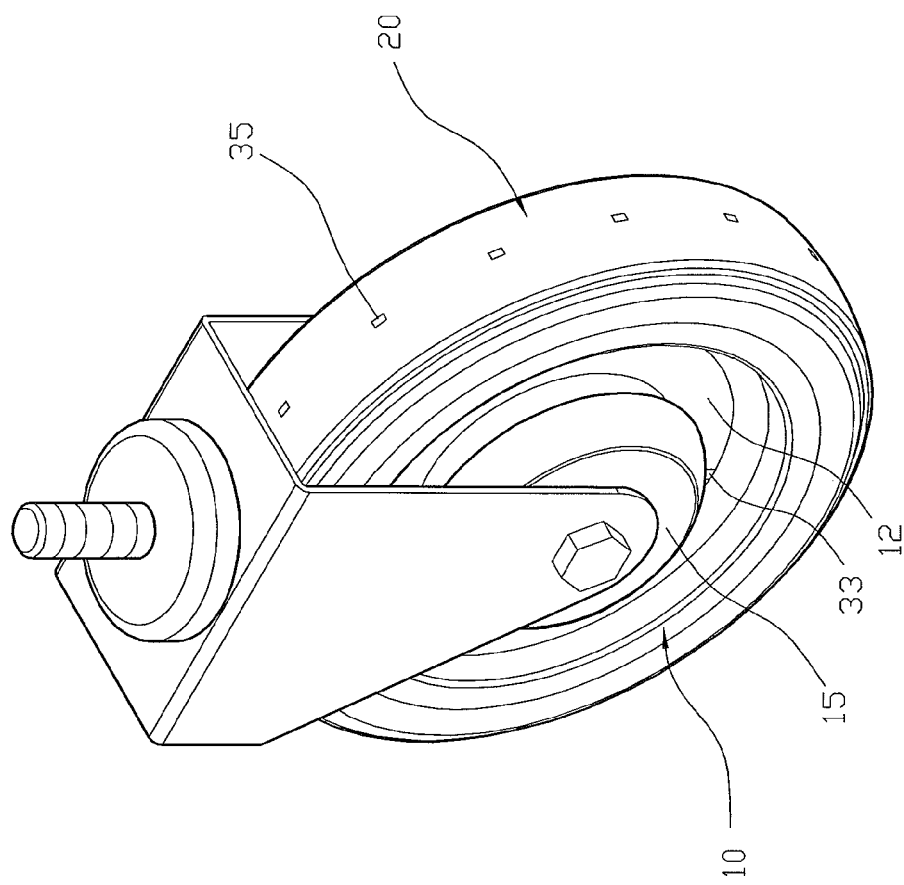
FIG. 1 is a perspective view of a conductive wheel in accordance with the preferred embodiment of the present invention.
Figure 2:
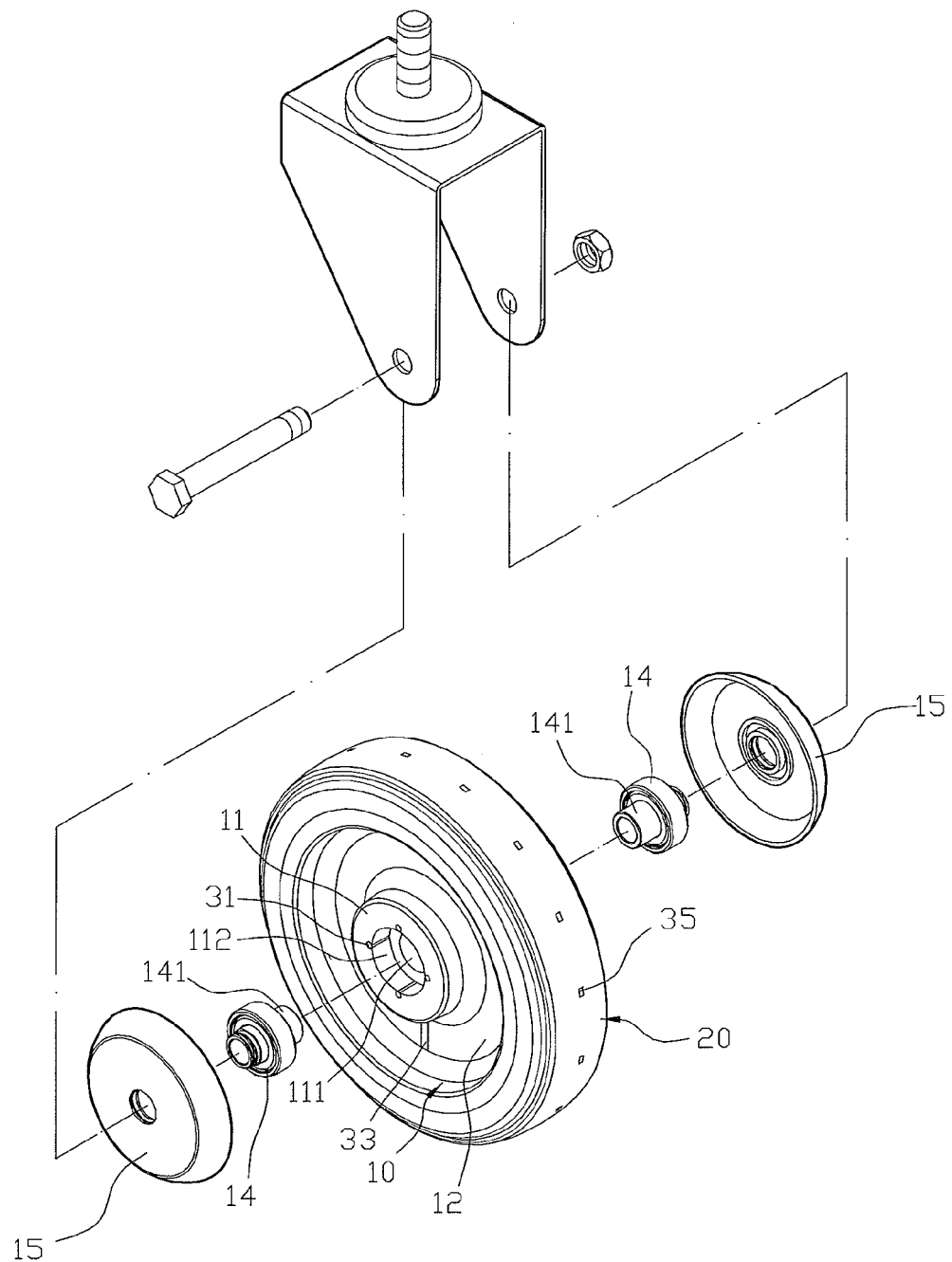
FIG. 2 is an exploded perspective view of the conductive wheel as shown in FIG. 1.
Figure 3:
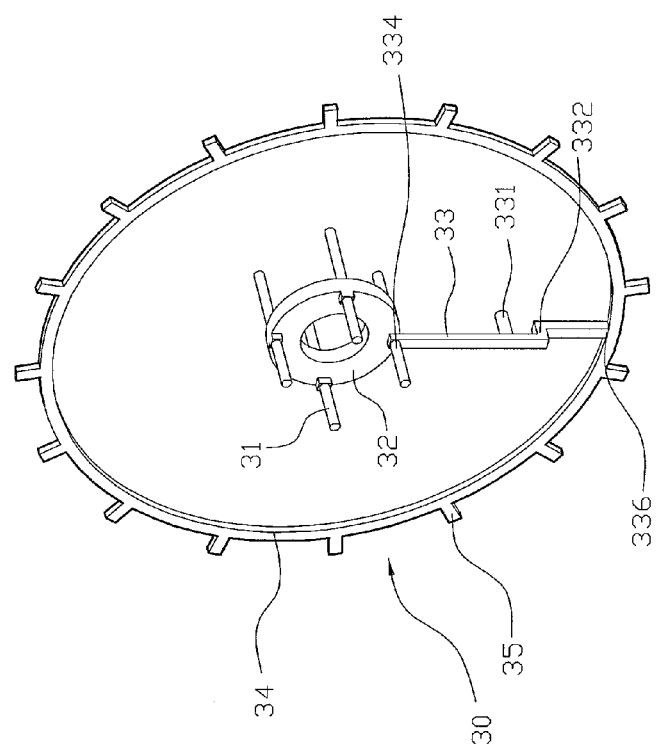
FIG. 3 is a perspective view of an electrically conductive assembly of the conductive wheel in accordance with the preferred embodiment of the present invention.
Figure 4:
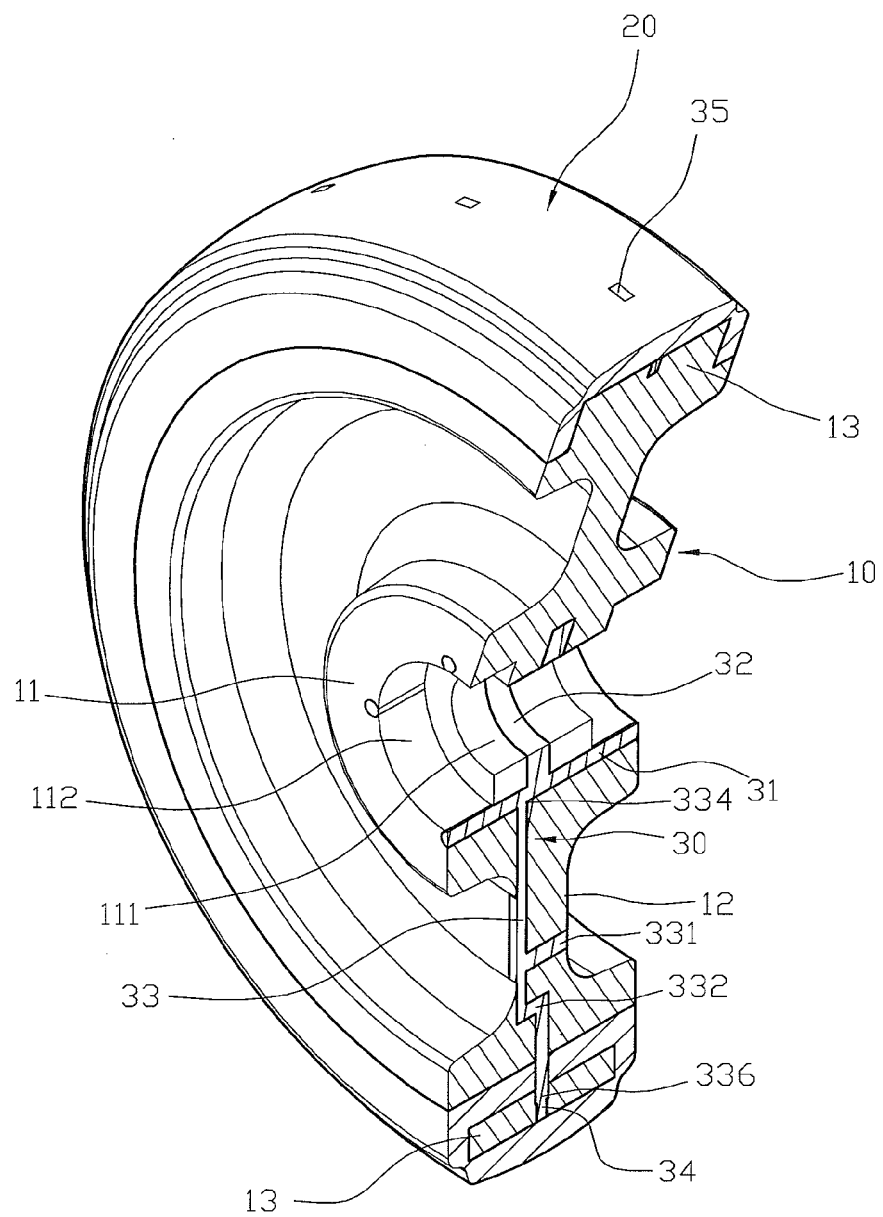
FIG. 4 is a perspective cross-sectional view of the conductive wheel as shown in FIG. 1.
Figure 5:
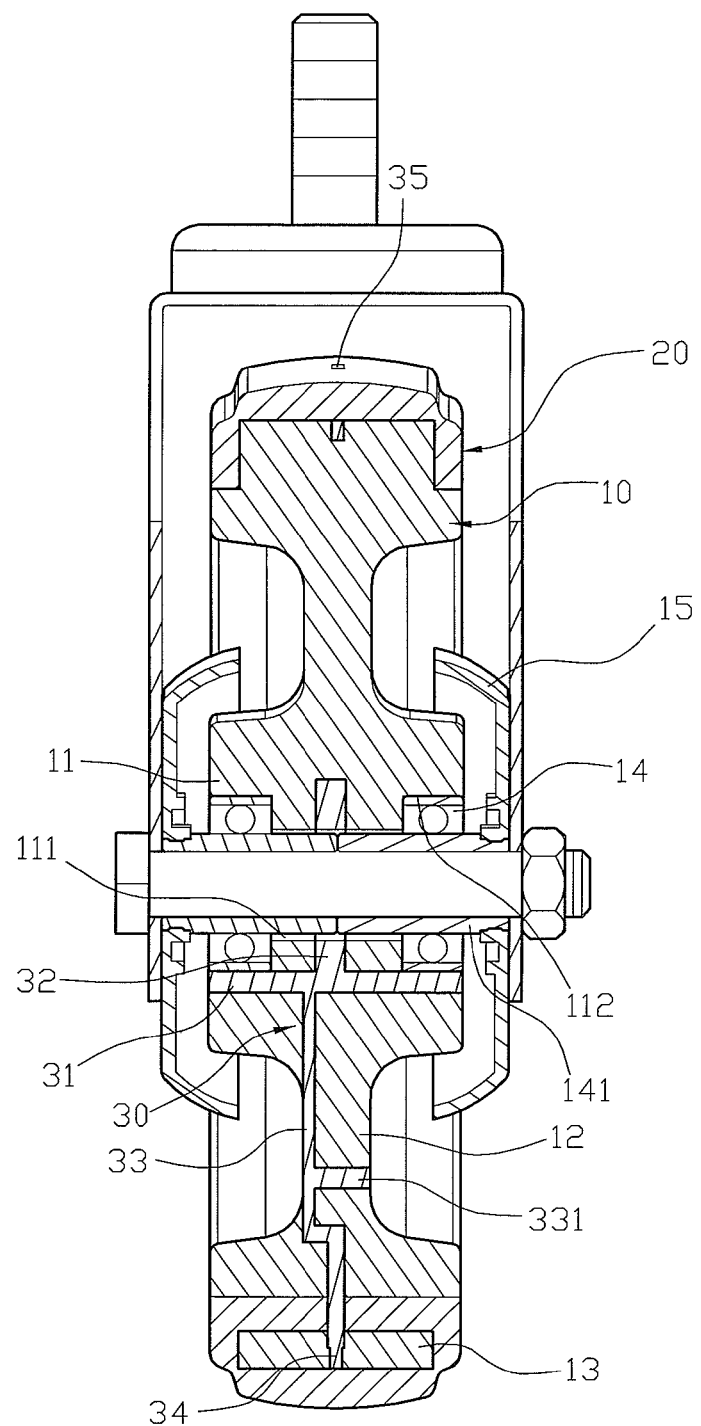
FIG. 5 is a side cross-sectional view of the conductive wheel as shown in FIG. 1.
Figure 6:
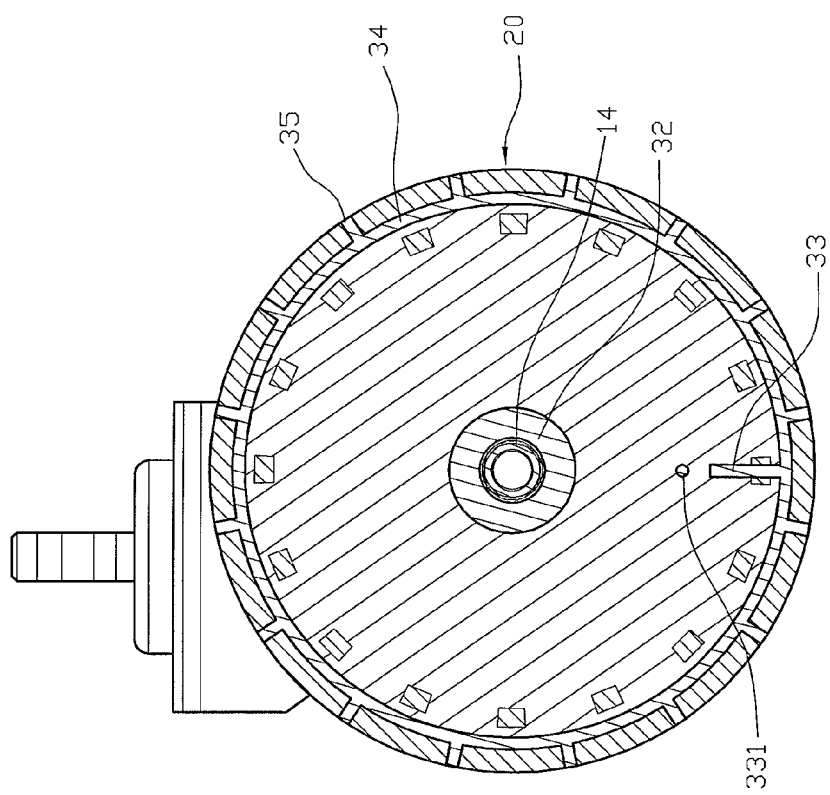
FIG. 6 is a front cross-sectional view of the conductive wheel as shown in FIG. 1.

Referring to the drawings and initially to FIGS. 1-6, a conductive wheel in accordance with the preferred embodiment of the present invention comprises a hub 10, a tread 20 mounted on the hub 10, two bearings 14 mounted in the hub 10 and each having a axle 141, an electrically conductive assembly 30 mounted in the hub 10 and the tread 20, and two covers 15 mounted on the hub 10 to cover the two bearings 14 and the axle 141 of each of the two bearings 14.

In the preferred embodiment of the present invention, the conductive wheel is integrally formed by a plastic injection molding process.

The hub 10 has a central portion provided with an inner flange 11 and has a periphery provided with an outer flange 13. The hub 10 has a mediate portion provided with a recessed support portion 12 which is located between the inner flange 11 and the outer flange 13. The inner flange 11 of the hub 10 has an interior provided with an axle hole 111 and has two opposite sides each provided with a mounting recess 112 connected to the axle hole 111. The mounting recess 112 of the inner flange 11 has a size greater than that of the axle hole 111.

The tread 20 is formed by injection molding to coat and encompass the outer flange 13 of the hub 10.

Each of the two bearings 14 is mounted in the respective mounting recess 112 of the inner flange 11 of the hub 10. The axle 141 of each of the two bearings 14 is extended into the axle hole 111 of the inner flange 11 of the hub 10.

The electrically conductive assembly 30 is made of a composite conductive material and is coated in and surrounded by the hub 10 and the tread 20 by injection molding. The electrically conductive assembly 30 includes a contact ring 32, a plurality of connecting rods 31 each connected with the contact ring 32, a conductive ring 34 located outside of the contact ring 32, and a connecting bar 33 connected between the contact ring 32 and the conductive ring 34.

Each of the connecting rods 31 of the electrically conductive assembly 30 is extended through the contact ring 32. Each of the connecting rods 31 of the electrically conductive assembly 30 is extended axially along a periphery of the inner flange 11 of the hub 10 and is extended into and exposed from an inner wall of the mounting recess 112 of the inner flange 11. Each of the connecting rods 31 of the electrically conductive assembly 30 is in contact with the two bearings 14. Thus, the electrically conductive assembly 30 is in contact with the two bearings 14 to form a grounding effect.

The contact ring 32 of the electrically conductive assembly 30 is located at a middle position of each of the connecting rods 31. The contact ring 32 of the electrically conductive assembly 30 is extended into and exposed from an inner wall of the axle hole 111 of the inner flange 11. The contact ring 32 of the electrically conductive assembly 30 is in contact with the axle 141 of each of the two bearings 14.

The conductive ring 34 of the electrically conductive assembly 30 surrounds and is spaced from the contact ring 32. The conductive ring 34 of the electrically conductive assembly 30 is embedded in the outer flange 13 of the hub 10. The conductive ring 34 of the electrically conductive assembly 30 has a periphery provided with a plurality of projecting grounding portions 35. Each of the grounding portions 35 of the conductive ring 34 is extended into and exposed from a surface of the tread 20.

The connecting bar 33 of the electrically conductive assembly 30 is extended through the support portion 12 of the hub 10 and is extended into the outer flange 13 of the hub 10. The connecting bar 33 of the electrically conductive assembly 30 has a first side exposed from a first side of the support portion 12 of the hub 10 and a second side provided with a branch rod 331 exposed from a second side of the support portion 12 of the hub 10. The connecting bar 33 of the electrically conductive assembly 30 has a first end 334 connected with the contact ring 32 and a second end 336 connected with the conductive ring 34. The first end 334 of the connecting bar 33 is in contact with one of the connecting rods 31. The second end 336 of the connecting bar 33 is located between two of the grounding portions 35 of the conductive ring 34. The connecting bar 33 of the electrically conductive assembly 30 has a mediate portion provided with a bent portion 332.

Figure 7:
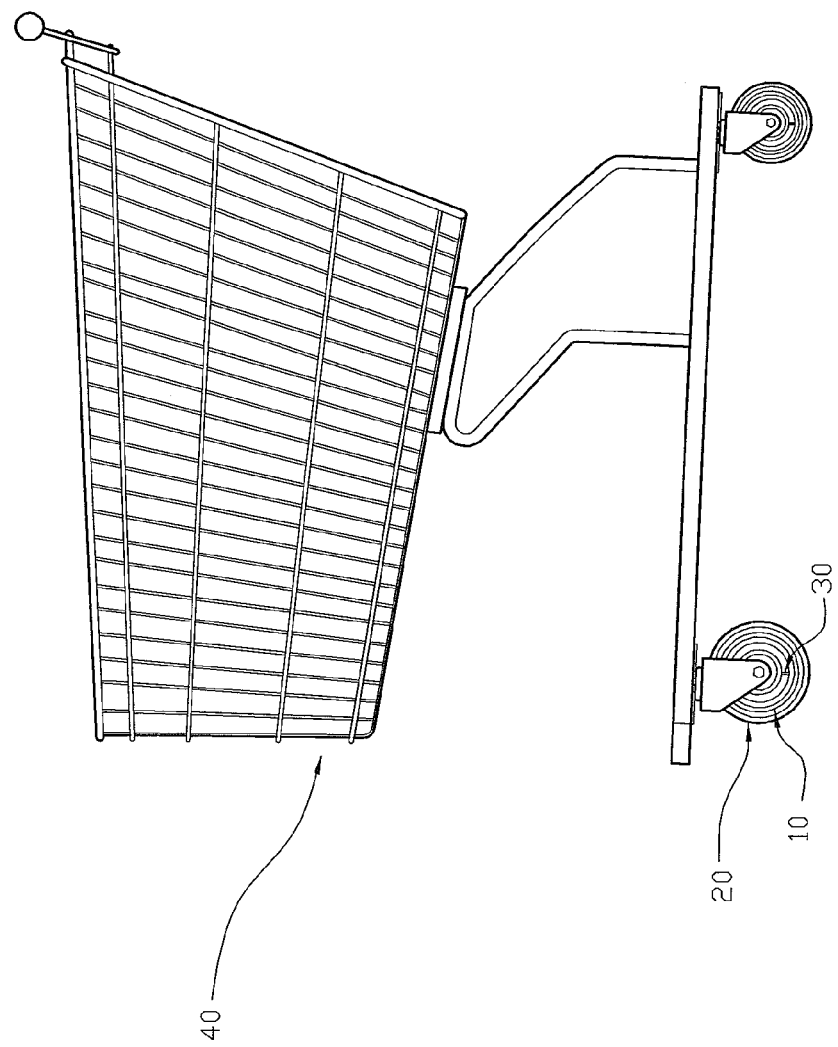
FIG. 7 is a schematic operational view of the conductive wheel for a cart as shown in FIG. 1 in use.

In operation, referring to FIG. 7 with reference to FIGS. 1-6, the conductive wheel is mounted on the bottom of vehicle, such as a cart 40 and the like. Thus, the two bearings 14 of the conductive wheel frequently contact and rub the skeleton and screw members of the cart 40 to produce static charges. At this time, each of the connecting rods 31 of the electrically conductive assembly 30 is in contact with the two bearings 14, the contact ring 32 of the electrically conductive assembly 30 is in contact with the axle 141 of each of the two bearings 14, and each of the grounding portions 35 of the conductive ring 34 is exposed from a surface of the tread 20, so that the electrically conductive assembly 30 is in contact with the two bearings 14 to form a grounding effect. In such a manner, the static charges produced between the two bearings 14 and the cart 40 are conducted through the electrically conductive assembly 30 and are released to the ground through the grounding portions 35 of the conductive ring 34 to prevent from causing an electrical shock to a user when the user touching the cart 40, thereby protecting the user's safety.

Accordingly, the electrically conductive assembly 30 between the hub 10 and the tread 20 will form a grounding effect to conduct and release the static charges produced by rubbing or other actions between the two bearings 14 and the cart 40 to the ground so as to prevent from causing an electrical shock to a user when the user touching the cart 40, thereby protecting the user's safety when operating the cart 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A conductive wheel, comprising:
   a hub;
   a tread mounted on the hub;
   two bearings mounted in the hub and each having a axle; and
   an electrically conductive assembly mounted in the hub and the tread;
   wherein the hub has a central portion provided with an inner flange and has a periphery provided with an outer flange;
   the hub has a mediate portion provided with a recessed support portion which is located between the inner flange and the outer flange;
   the inner flange of the hub has an interior provided with an axle hole and has two opposite sides each provided with a mounting recess connected to the axle hole;
   the tread coats and encompasses the outer flange of the hub;
   each of the two bearings is mounted in the respective mounting recess of the inner flange of the hub;
   the axle of each of the two bearings is extended into the axle hole of the inner flange of the hub;
   the electrically conductive assembly includes:
   a contact ring;
   a plurality of connecting rods each connected with the contact ring;
   a conductive ring located outside of the contact ring; and
   a connecting bar connected between the contact ring and the conductive ring;
   each of the connecting rods of the electrically conductive assembly is extended axially along a periphery of the inner flange of the hub and is extended into and exposed from an inner wall of the mounting recess of the inner flange;
   each of the connecting rods of the electrically conductive assembly is in contact with the two bearings;
   the contact ring of the electrically conductive assembly is extended into and exposed from an inner wall of the axle hole of the inner flange;
   the contact ring of the electrically conductive assembly is in contact with the axle of each of the two bearings;
   the conductive ring of the electrically conductive assembly is embedded in the outer flange of the hub;
   the conductive ring of the electrically conductive assembly has a periphery provided with a plurality of projecting grounding portions;
   each of the grounding portions of the conductive ring is extended into and exposed from a surface of the tread;
   the connecting bar of the electrically conductive assembly is extended through the support portion of the hub and is extended into the outer flange of the hub.

2. The conductive wheel of claim 1, wherein the conductive wheel is integrally formed by a plastic injection molding process.

3. The conductive wheel of claim 1, wherein the conductive wheel further comprises two covers mounted on the hub to cover the two bearings and the axle of each of the two bearings.

4. The conductive wheel of claim 1, wherein the connecting bar of the electrically conductive assembly has a first side exposed from a first side of the support portion of the hub.

5. The conductive wheel of claim 4, wherein the connecting bar of the electrically conductive assembly has a second side provided with a branch rod exposed from a second side of the support portion of the hub.

6. The conductive wheel of claim 1, wherein the connecting bar of the electrically conductive assembly has a first end connected with the contact ring and a second end connected with the conductive ring.

7. The conductive wheel of claim 6, wherein the first end of the connecting bar is in contact with one of the connecting rods;
the second end of the connecting bar is located between two of the grounding portions of the conductive ring.

8. The conductive wheel of claim 1, wherein the mounting recess of the inner flange has a size greater than that of the axle hole.

9. The conductive wheel of claim 1, wherein each of the connecting rods of the electrically conductive assembly is extended through the contact ring.

10. The conductive wheel of claim 1, wherein the connecting bar of the electrically conductive assembly has a mediate portion provided with a bent portion.

11. The conductive wheel of claim 1, wherein the contact ring of the electrically conductive assembly is located at a middle position of each of the connecting rods.

12. The conductive wheel of claim 1, wherein the conductive ring of the electrically conductive assembly surrounds and is spaced from the contact ring.

13. The conductive wheel of claim 1, wherein the electrically conductive assembly is made of a composite conductive material.

14. The conductive wheel of claim 1, wherein the electrically conductive assembly is coated in and surrounded by the hub and the tread by injection molding.

* * * * *